United States Patent [19]

Kennedy

[11] E Patent Number: Re. 31,757

[45] Reissued Date of Patent: Dec. 4, 1984

[54] COMPOSITION AND A METHOD FOR CONTROLLING REACTION PRESSURES DURING THE FOAMING PROCESS RESULTING IN AN EASILY FLAME RETARDED FOAM-IN PLACE INSULATION

[75] Inventor: Richard B. Kennedy, Ridgefield, Conn.

[73] Assignees: Patrick J. Crehan; Richard J. Fricke, both of Ridgefield, Conn. ; part interest to each

[21] Appl. No.: 443,877

[22] Filed: Nov. 23, 1982

Related U.S. Patent Documents

Reissue of:

[64] Patent No.: 4,291,129
Issued: Sep. 22, 1981
Appl. No.: 162,821
Filed: Jun. 25, 1980

[51] Int. Cl.[3] ..... C08G 18/14

[52] U.S. Cl. ..... 521/103; 521/106; 521/107; 521/108; 521/109.1; 521/119; 521/120; 521/123

[58] Field of Search ..... 521/103, 106, 107, 108, 521/109, 119, 120, 123

[56] References Cited

U.S. PATENT DOCUMENTS

| | | | |
|---|---|---|---|
| 3,004,934 | 10/1961 | Dosmann et al. | 521/163 |
| 3,277,213 | 10/1966 | Fuzesi | 528/73 |
| 3,658,731 | 4/1972 | Richardson et al. | 521/109 |
| 3,674,717 | 7/1972 | Fuzesi et al. | 521/169 |
| 3,956,202 | 5/1976 | Iwasaki | 521/107 |
| 4,291,129 | 9/1981 | Kennedy | 521/103 |

*Primary Examiner*—Maurice J. Welsh
*Attorney, Agent, or Firm*—Wyatt, Gerber, Shoup, Scobey & Badie

[57] ABSTRACT

A low reactive pressure flame-retardant polyurethane foam made by reacting together a polymeric isocyanate, a polyol, an aqueous solution of a carbohydrate, calcium acid phosphate, sodium aluminum sulfate, sodium bicarbonate, and a flame retardant. A blowing agent may be present.

36 Claims, No Drawings

COMPOSITION AND A METHOD FOR CONTROLLING REACTION PRESSURES DURING THE FOAMING PROCESS RESULTING IN AN EASILY FLAME RETARDED FOAM-IN PLACE INSULATION

Matter enclosed in heavy brackets [ ] appears in the original patent but forms no part of this reissue specification; matter printed in italics indicates the additions made by reissue.

BACKGROUND OF THE INVENTION

The present invention relates to a composition and a method for controlling reaction pressures during the foaming process resulting in an easily flame retarded foam-in place insulation.

The present invention is the subject of an Invention Disclosure Document filed Feb. 4, 1980, Disclosure Document No. 087883.

Rigid plastic foams have been widely utilized as thermal insulating materials, light construction materials, and floating materials because of their excellent properties. However, since they are composed of plastic materials they can provide a substantial fuel contribution, cause rapid flame spread and produce a great deal of noxious smoke on thermal decomposition when burned or heated to an elevated temperature, thus leading to their limited use as construction material.

With the present invention in conserving heating fuel, many existing buildings are having additional insulation added to their structures, and newly constructed buildings are including more insulation then was formerly used.

A most commonly used type of insulation for existing structures is ureaformaldehyde foam, which is foamed in place between the outside wall and the inside wall of the structure. Unfortunately, the ureaformaldehyde foam can break down releasing noxious formaldehyde fumes. Some jurisdictions have already prohibited the use of ureaformaldehyde foams in buildings because of the potential continual long term release of formaldehyde vapors.

Another type of material used for insulation is polyurethane foam. However, polyurethane foam provides a substantial fuel contribution, spreads flame rapidly, and releases toxic gases including but not by way of limitation gases such as carbon monoxide carbon dioxide, and hydrogen cyanide when burned. Additionally, polyurethane foam generally disintegrates when burned. Polyurethane foam cannot be used to retrofit existing structures with in-wall insulation due to the high reaction pressures generated during the foaming process which can be sufficient to separate the wallboard from the wall studs.

Rigid polyurethane foams are generally prepared by reacting an organic polyisocyanate with a polyol in the presence of a foaming agent surfactant and catalyst. In order to reduce the cost of preparing these foams, efforts have been made to employ starch as a polyol reactant in the preparation of urethane foams. The use of starch directly has been unsatisfactory because of the poor physical properties of the foam which results. Oxyalkylated starch yields satisfactory foams, but the direct oxyalkylation of starch results in degradation or decomposition of the starch and a product which is not uniform in chemical or physical properties.

A satisfactory process for utilizing starch as a component in the preparation of polyurethane foams is disclosed in U.S. Pat. No. 3,277,213. In this process, starch is added to a polyhydric alcohol containing at least two hydroxyl groups in a proportion equivalent to at least 0.5 mole of the alcohol per mole of glucose unit weight of starch in the presence of an acid catalyst. The resulting mixture is then oxyalkylated to yield a polyether polyol suitable for use in preparating polyurethane foams of excellent physical properties. Although it is generally recognized that the presence of high proportions of nitrogen, phosphorus, and/or chlorine atoms enhances the flame resistance of urethane foams, present techniques for adding these components to urethane foams are not entirely satisfactory.

U.S. Pat. No. 3,674,717, discloses a process for preparing flame-retardant polyurethane foams by admixing starch with phosphoric acid at an elevated temperature and oxyethylating the resulting mixture to yield a starch-phosphorus-based polyether useful as a reactant in the preparation of urethane foams with flame-retardant properties.

Another method of making flame retardant polyurethane foams, as disclosed in U.S. Pat. No. 3,658,731, is by reacting dry whey or lactose and whey or yeast protein with a polyisocyanate in the presence of dimethylsulfoxide.

SUMMARY OF THE INVENTION

The present invention relates to a composition and method for foaming in place an easily flame retarded, inexpensive, low reactive pressure polyurethane foam containing untreated starch and other chemicals.

It has been found that polyurethane foams prepared in accordance with the present invention possess flame retardant properties and retain their structural integrity when exposed to flame. Upon exposure to heat or flame, the foam neither disintegrates nor loses structural integrity.

The foam composition is based on a polyurethane made from a polymeric isocyanate, compatible polyether polyol, and an aqueous slurry or solution of an untreated carbohydrate such as cornstarch corn syrup, dextrose, sucrose, molasses, and the like. The foam composition additionally contains calcium acid phosphate, sodium aluminum sulfate, sodium bicarbonate, and a commercially available flame retardant chemical such as sodium chloride, calcium chloride, borax, an alkali metal borate, tricresyl phosphate, tris (2-chloroethyl) phosphate, tris (chloropropyl) phosphate, 0,0-diethyl-N, N-bis-(2-hydroxyethyl) aminomethyl phosphonate, metal oxides and chlorides such as antimony oxide, alumina and antimony oxychloride. A polyurethane catalyst may also be included in the composition.

The principal reaction involved occurs between the polyisocyanate and the polyhydroxy compound to yield a polyurethane polymer. The heat generated by the exothermic polymerization reaction causes the foaming agent, such as a low boiling hydrocarbon, to vaporize, whereby the vapors become entrapped to form the desired cellular structure. Alternatively, the mixture can be foamed by vigorous agitation to incorporate air into the polymeric system. Another alternative is a combination aqueous solution of sodium bicarbonate, potassium tartarate, and either calcium hypochlorite or sodium hypochlorite which can be added to the reaction mixture to function as a blowing agent.

Isocyanates which can be used in the present invention include the following compounds: tolylene-2,4-diisocyanate, polymethylene polyphenyl isocyanate, tolylene-2,6-diisocyanate, and a mixture thereof, either crude or purified diphenylmethane 4,4'-diisocyanate, 3-methyldiphenylmethane-4,4'-diisocyanate, m- and p-phenylenediisocyanate, and naphthalene-1,5-diisocyanate. Either crude or pure isocyanates can be used. A prepolymer having isocyanate groups at the ends which can be prepared by the reaction of an excess of polyisocyanate with a lesser amount of a polyol having more than two hydroxyl groups per molecule can also be used in this invention. The combined use of more than two polyisocyanates is also possible.

Polyols which can be used in this invention include polyether polyols prepared by combining one or more alkylene oxides (such as ethylene oxide, propylene oxide, and butylene oxide) with a reaction initiator (such as water, ethylene glycol, glycerine, trimethylol-propane, pentaerythritol, ethylenediamine, sorbitol, and sucrose). Another type of polyol that can be used is a polyester polyol having hydroxyl groups at the ends prepared by a condensation reaction of one or more polyhydroxyl alcohols, such as ethylene glycol or trimethylol-propane, with one or more polycarboxylic acids, such as adipic, phthalic, or succinic acids. Another example of a polyol useful in the present invention is a polymer polyol which can be prepared by graft polymerizing polyacrylonitrile to an aliphatic polyol.

Water is used with the carbohydrate in the present invention in order to provide a carrier for the carbohydrates and inorganic salts. The amount of water used is kept to a minimum to prevent "sighing", i.e., the collapse of the foam, as well as to aid in the reduction of the pressure of the foaming reaction.

The total amount of water used in the syrup in the present composition should be from about one part of water to four parts of syrup to about four parts of water to about one part of syrup, all parts by weight. The preferred ratio of water to syrup is 1:1.

By increasing the amount of polyol, the foam density is reduced. Additionally, with an increase in the amount of polyol, the reaction temperatures and pressures increase. In a typical polyol isocyanate mix, the reaction pressure is such that the foam causes wallboard to separate from the wall studs if the reaction mixture is foamed in place for insulation. In the present invention, if an excess of polyol is used, the reaction pressure increases, but not to a level which would separate wallboard from the wall studs.

As the amount of polyol in the reaction mixture is reduced, the cure time is extended and the temperatures and pressures of the reaction are reduced. The resulting foam is generally denser.

To prepare the syrup for use with the polyol, preferably from 1 to 6 ounces of cornstarch or other carbohydrate are mixed with 10 ounces of water and from 10–30 milligrams each of calcium acid phosphate, sodium aluminum sulfate, and sodium bicarbonate. There is no upper limit to the amount of carbohydrate that can be used in the present invention, other than viscosity limitations, as the cornstarch increases the viscosity of the mixture. Where corn syrup is used in the mixture, the corn syrup provides approximately 9% by weight of additional water to the mixture.

The amount of water in the composition, which also acts as a blowing agent for the foam, results in the restricted evolution of carbon dioxide, which is generated by the reaction of water with isocyanate. For the purpose of adjusting the density of the rigid foams, low boiling hydrocarbons, carbon dioxide, or chlorofluoroalkanes can be used as a blowing agent in conjunction with the water. Chlorofluoroalkanes which can be used in the present invention include those generally used in the preparation of polyurethane foams. Suitable hydrocarbons and haloalkanes should be chemically inert toward the polyisocyanate and have a boiling point less than 100° C., preferably from −50° C. to 70° C. Suitable haloalkanes include methylene chloride, ethylenetrichloride, trichloromonofluoromethane, dichlorodifluoromethane, dichlorotetrafluoroethane, and dibromomonofluoroalkane.

A catalyst may be used to form trimers of the isocyanate as well as catalysts to form urethane bonds and/or those to form urea bonds and/or buiret bonds. Some catalysts which act in the formation reactions of trimers of isocyanate also show catalytic activity in the formation of urethane-, urea-, and/or buiret bonds, and vice versa. These catalysts cannot appropriately be classified in different categories, but they may be classified according to their most predominant catalytic tendencies, respectively, as is adopted here.

Catalysts which act to form trimers of isocyanate in the present invention include 2, 4, 6-tris(dimethylaminomethyl)phenol, o- and p-dimethylaminomethylphenol, N,N',N''-tris(dimethylaminopropyl)-sym-hexahydrotriazine, benzyltrimethylammonium methoxide, alkali metal salts of carboxylic acids (such as potassium acetate, potassium propionate, potassium octanate, and potassium benzoate), alkali metal salts of weak acids other than carboxylic acids (such as, for example, potassium arsenate, sodium benzenesulfonate, potassium p-nitrophenolate), inorganic bases (such as sodium hydroxide and potassium hydroxide), sodium methoxide, salts of lead, cobalt, iron, cadmium, and chromium.

Catalysts which are liquid at room temperature may be used as is and mixed with the polyols, and those which are solids may be used in the form of a solution prepared beforehand in dimethylformamide or dimethylsulfoxide, or mixed in water with the carbohydrate.

Catalysts which act in forming the urethane bonds, urea bonds, and buiret bond are common to those which are used generally in the preparation of polyurethane foams. These catalysts can be conveniently classified into tertiary amines and organometallic compounds. The tertiary amines include triethylamine, triethanolamine, diethanoamine, monethanolamine, dimethylmonoethanolamine, triethylinediamine, tetramethylpropanediamine, tetramethyl-1,3-butanediamine, and pentamethyldiethyltriamine. Organometallic compounds include, for example, dibutyltin dilaurate, dibutyl tin diacetate, bityl tin dicaprylate, and stannous octoate. Of course, these catalysts can be used either alone or in combination. The amounts to be used are in accordance with their reactivity.

Surfactants are used to stabilize the foam during the foaming process. Surfactants which can be used in the present invention include; Dow Corning (R) 193 a.k.a DC 193, which is a nonhydrolizable silicone glycol copolymer. Union Carbide's (R) L 5420 is another nonhydrolyzable silicone glycol copolymer which may be used.

To make the foam according to the present invention, the inorganic salts, corn starch, flame retardant compounds, surfactants, and catalysts are dissolved in a minimum amount of water and mixed withe the carbohydrate syrup. The carbohydrate syrup containing the aforementioned ingredients is then added to the polyol and thoroughly mixed. Already mixed carbohydrate syrup and polyol solution is then added to the isocyanate and thoroughly mixed. The resulting mixture, which is liquid, is then introduced into a mold or behind a wall to form a flame retarded insulating foam. The ingredients can be combined in a commercially available mixing gun for introduction into the mold.

In the present invention, the preferred ratio of isocyanate, polyol and carbohydrate syrup mix are 1 part by weight polyol, 1 part by weight isocyanate and 1 part by weight carbohydrate syrup mix. Variations in the ratios effect the reaction time, density, yield and quality of the foam.

The carbohydrate syrup is a mixture of water, corn starch, and/or corn syrup. The only limits to variation of the mix relate to viscosity limitations. This mixture may also contain surfactants and catalyst to speed the reaction and reduce the possibility of collapse during the foaming process.

The inorganic salts are present in small amounts, generally about 10 to 100 milligrams each of calcium hydrogen phosphate, aluminum sulfate, and sodium bicarbonate per ounce of isocyanate.

The flame retardant compounds are mixed with the carbohydrate syrup for addition to the reaction mixture. These compounds are used in amounts necessary to provide flame retardancy to the resulting polyurethane foam, generally in amounts ranging from 20 to 200 milligrams per ounce of polyol.

The order of addition of ingredients to produce the foam of the present invention is necessary to ensure the proper reaction conditions. The foam of the present invention, while conventional urethane foams, does not normally produce unacceptable high reaction pressures or temperatures.

Typical polyurethane foam formulas composed of polyol and isocyanate result in a reaction which severely limits "off gassing" causing high reactive pressures. When the carbohydrate syrup is mixed with the polyol, which is then added to the isocyanate, additional "off gassing" occurs resulting in reduced reactive pressure. The foam yield is increased with the addition of the carbohydrate syrup.

Where the reduction of the amount or the elimination of the conventional blowing agent is desired, a combination of sodium acid phosphate and potassium acid tartarate, calcium bicarbonate, corn starch, and either calcium hypochlorite or sodium hypochlorite may be dissolved in the carbohydrate syrup. In this process, from 10 to 20 parts by weight of hypochlorite and from 20 to 40 parts by weight of the aforementioned additives are used per 100 parts by weight of polyol.

When a conventional blowing agent is used, in combination with either calcium or sodium hypochlorite, two distinct consecutive reactions appear to occur. The first reaction appears to be the same as a conventional foaming reaction containing a typical blowing agent, with some rising of the foam. The rising of the foam stops, the foam appears to boil, and then the foam rises a second time.

Halogenated hydrocarbons containing freon routinely used as a blowing agent in urethane foam are currently being scrutinized by The Federal Environmental Protection Agency and useage limitations may be imposed.

A Freon-free foam can be made by a slight modification of the carbohydrate syrup.

To make foam under this invention which would contain no freon blowing agent, the amount of calcium or sodium hypochlorite is increased as are the amounts of surfactant and catalyst resulting in a $CO_2$-blown foam of good quality.

Upon foaming, the mixture provides an insulating flame-resistant rigid foam having closed cells and a skin on the outside of the foam. These closed cells and skin act as a vapor barrier for the foam, so that normally no additional vapor barrier is necessary to provide a superior insulating material. Certain potential applications may be practical without the addition of a flame retardant. A low reactive pressure non-flame retarded foam may also be produced under this invention.

TYPICAL FORMULATIONS OF THIS INVENTION

EXAMPLE I

Ten ounces polymethylene polyphenyl isocyanate (Mobay MONDUR MR ®) was mixed with ten ounces of a solution of water and syrup containing four ounces of cornstarch (Corn Products Starch 3005); 30 milligrams calcium acid phosphate; 30 milligrams sodium aluminum sulfate; 30 milligrams sodium bicarbonate; 60 milligrams sodium chloride, one ounce surfactant and ¼ ounce polyurethane. The above ingredients were mixed in a mixing tank of suitable capacity with an electric mixer. To this mixture was added ten ounces of polyether polyol containing surfactant, polyurethane, and blowing agent, and the entire mixture blended. The final mixture was poured into a wall cavity, where it foamed and provided excellent permanent bonding to all the surfaces of the wall cavity.

EXAMPLE II

A rigid polyurethane foam was prepared using calcium bicarbonate and sodium hypochlorite as a blowing agent.

Ten ounces of (Mobay MONDUR MR ®) polymethylene polyphenyl isocyanate was mixed with ten ounces of water and syrup solution containing three ounces of cornstarch (Corn Products Starch 3005); 30 milligrms calcium acid phosphate; 30 milligrams sodium aluminum sulfate; 30 milligrams sodium bicarbonate; 50 milligrams calcium chloride; one ounce calcium hypochlorite; one ounce surfactant and ¼ ounce catalyst. To this is added ten ounces of Mobay E 9214 ® polyether polyol; one-half ounce DC 193 Silicone Surfactant (nonhydrobyzable silicone glycol copolymer), and one-tenth ounce DABCO 33LV ® catalyst, and the resulting mixture was blended thoroughly. The mix was then poured into a wall cavity and allowed to foam to fill the wall cavity.

EXAMPLE III

Ten ounces of polymethylene polyphenyl isocyanate was mixed with ten ounces of corn syrup; 20 milligrams calcium acid phosphate; 20 milligrams sodium aluminum sulfate; 100 milligrams sodium bicarbonate; 50 milligrams calcium chloride, one-quarter ounce calcium hypochlorite; one ounce surfactant and ¼ ounce catalyst. To this mixture was added ten ounces of polyether polyol prepared by adding ethylene oxide and propylene oxide to glycerine and one gram of fluorotrichloromethane. The material was introduced into a wall cavity, whereupon the material provided a rigid, low-density foam.

In order to introduce the foamable mixture of the present invention into a wall cavity, the following equipment can be used:

1. A mixing tank to blend the ingredients of the formulation. The mixing tank ideally possesses means to cool or heat the mix.

2. A high pressure, low volume metering transfer pump to measure and transfer the chemical mix from the mixing tank to the wall cavity.

3. An entrance post-surplus foam collector. This assembly slides into the hole drilled into the interior wall board or external sheathing of the wall. This assembly is to direct the flow of liquid downward, collect the surplus foam, and protect the finished wall surfaces from "foam staining."

In addition, the composition of the present invention can be foamed in standard, commercially available urethane foaming equipment which employs a mixing head and pumps the foam into the wall cavity.

What is claimed is:

1. A low reactive pressure flame-retardant polyurethane foam made by reacting together a [polymeric isocyanate] *polyisocyanate,* a conventional polyol, a surfactant, [a blowing agent] and an aqueous solution *or slurry* of a carbohydrate, calcium acid phosphate, sodium aluminum sulfate, sodium bicarbonate, and flame retardant.

2. The polyurethane foam according to [claim 1] *claims 1, 15, 16 or 17* wherein the carbohydrate is selected from the group consisting of cornstarch, corn syrup, dextrose, sucrose, and molasses.

3. The polyurethane foam according to [claim 2] *claims 1, 15, 16 or 17* wherein the carbohydrate is cornstarch.

4. The polyurethane foam according to [claim 2] *claims 1, 15, 16 or 17* wherein the carbohydrate is corn syrup.

5. The polyurethane foam according to [claim 1 including] *claims 16 or 17 wherein the blowing agent is* a hypochlorite salt selected from the group consisting of calcium hypochlorite and sodium hypochlorite.

6. The polyurethane foam according to [claim 1] *claims 1, 15, 16 or 17* wherein the flame retardant is selected from the group consisting of sodium chloride, calcium chloride, alkali metal borates, tri-cresyl phosphate, tris(2-chloroethyl) phosphate, tris(chloropropyl) phosphate, O,O-diethyl-N,N-bis(2-hydroxyethyl) aminomethyl phosphate, antimony oxide, alumina, and antimony oxychloride.

7. The polyurethane foam according to [claim 1] *claims 15 or 16* wherein the blowing agent is selected from the group consisting of methylene chloride, ethylenetrichloride, trichloromonofluoromethane, dichlorodefluoromethane, and dichlorotetrafluoroethane.

8. The polyurethane foam according to [claim 1] *claims 1, 15, 16 or 17* including a catalyst.

9. A method for making a flame-retardant polyurethane foam comprising:

a. [dissolving] *mixing* a carbohydrate, calcium acid phosphate, sodium aluminum sulfate, sodium bicarbonate, surfactant, and a flame retardant selected from the group consisting of sodium chloride, calcium chloride, alkali metal borates, tri-cresyl phosphate, tris(2-chloroethyl phosphate), tris(chloropropyl)-phosphonate, O,O-diethyl-N,N-bis-(2-hydroxyethyl)aminoethyl phosphate, antimony oxide, alumina, and antimony ocychloride, to form an aqueous solution; *or slurry* b. mixing the aqueous solution *or scurry* with [polyether] *conventional* polyol;

c. [adding to] *mixing with* the polyol-aqueous solution *or slurry* mixture a [polymer isocyanate] *polyisocyanate* and [mixing];

d. allowing the mixture to [faom] *foam.*

10. The method of [claim 9] *claims 9, 13, 25 or 26* wherein the carbohydrate is selected from the group consisting of cornstarch, corn syrup, dextrose, sucrose and molasses.

11. The method of [claim 10] *claims 9, 13,25 or 26* wherein the carbohydrate is cornstarch.

12. The method of [claim 10] *claims 9, 13, 25 or 26* wherein the carbohydrate is corn syrup.

13. The method of claim 9 wherein a blowing agent is added to the polyol-aqueous solution *or slurry* mixture.

14. The method of [claim 9] *claims 9, 13, 25 or 26* wherein a catalyst is present in the aqueous solution *or slurry* of step (a).

*15. A polyurethane foam according to claim 1 wherein the polyisocyanate is polymeric isocyanate.*

*16. The polyurethane foam according to claim 1 wherein a blowing agent is incorporated in the reaction mixture.*

*17. The polyurethane foam according to claim 1 wherein the polyisocyanate is a polymeric isocyanate and a blowing agent is incorporated in the reaction mixture.*

*18. The low reactive polyurethane foam made by reacting together a polyisocyanate, a conventional polyol, a surfactant, and an aqueous solution or slurry of a carbohydrate, calcium acid phosphate, sodium aluminum sulfate, and sodium bicarbonate.*

*19. The polyurethane foam according to claim 18 wherein the polyisocyanate is a polymeric isocyanate.*

*20. The polyurethane foam according to claim 19 wherein a blowing agent is incorporated in the reaction mixture.*

*21. The polyurethane foam according to claim 18 wherein the polyisocyanate is a polymeric isocyanate and a blowing agent is incorporated in the reaction mixture.*

*22. The polyurethane foam according to claims 18, 19, 20 or 21 wherein the carbohydrate is selected from the group consisting of cornstarch, corn syrup, dextrose, sucrose and molasses.*

*23. The polyurethane foam according to claims 18, 19, 20 or 21 wherein the carbohydrate is cornstarch.*

*24. The polyurethane foam according to claims 18, 19, 20 or 21 wherein the carbohydrate is corn syrup.*

*25. The polyurethane foam according to claims 20 or 21 wherein the blowing agent is a hypochlorite salt selected from the group consisting of calcium hypochlorite and sodium hypochlorite.*

*26. The method of claim 9 wherein the polyisocyanate is a polymeric isocyanate.*

*27. The method of claim 9 wherein the polyisocyanate is a polymeric isocyanate and a blowing agent is incorporated in the polyol aqueous solution or slurry.*

*28. A method for making a polyurethane foam comprising:*

*a. mixing a carbohydrate, calcium acid phosphate, sodium aluminum sulfate, sodium bicarbonate and surfactant to form an aqueous solution or slurry;*

*b. mixing the aqueous solution or slurry with a conventional polyol;*

*c. mixing with the polyol-aqueous mixture a polyisocyanate and;*

*d. allowing the mixture to foam.*

*29. The method of claim 28 wherein the polyisocyanate is a polymeric isocyanate.*

*30. The method of claim 28 wherein a blowing agent is added to the polyol-aqueous solution or slurry.*

*31. The method of claim 28 wherein the polyisocyanate is a polymeric isocyanate and a blowing agent is incorporated in the polyol aqueous solution or slurry.*

*32. The method of claims 28, 29, 30 or 31 wherein the carbohydrate is selected from the group consisting of cornstarch, corn syrup, dextrose, sucrose and molasses.*

*33. The method of claims 28, 29, 30 or 31 wherein the carbohydrate is cornstarch.*

*34. The method of claims 28, 29, 30 or 31 wherein the carbohydrate is corn syrup.*

*35. The method of claims 13, 30 or 31 wherein the blowing agent is selected from the group consisting of methylene chloride, ethylenetrichloride, trichloromonofluoromethane, dichlorodifluoromethane and dichlorotetrafluoroethane.*

*36. The method of claims 28, 29, 30 or 31 wherein a catalyst is present in the aqueous solution or slurry of step (a).*

* * * * *